United States Patent
Lee

(10) Patent No.: US 9,644,750 B2
(45) Date of Patent: May 9, 2017

(54) FLOW PATH SWITCHING VALVE

(71) Applicant: LG ELECTRONICS INC., Seoul (KR)

(72) Inventor: Seungjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 488 days.

(21) Appl. No.: 14/386,145

(22) PCT Filed: Mar. 3, 2014

(86) PCT No.: PCT/KR2014/001723
§ 371 (c)(1),
(2) Date: Sep. 18, 2014

(87) PCT Pub. No.: WO2015/008916
PCT Pub. Date: Jan. 22, 2015

(65) Prior Publication Data
US 2016/0238140 A1 Aug. 18, 2016

(30) Foreign Application Priority Data
Jul. 18, 2013 (KR) ........................ 10-2013-0084547

(51) Int. Cl.
*F16K 1/228* (2006.01)
*F16K 11/052* (2006.01)
(Continued)

(52) U.S. Cl.
CPC .......... *F16K 1/228* (2013.01); *F16K 11/0525* (2013.01); *F25B 13/00* (2013.01);
(Continued)

(58) Field of Classification Search
CPC ...... F16K 1/228; F16K 11/0525; F25B 13/00; F25B 41/046; F25B 2500/221; F25B 2313/02731; F25B 2313/02741
(Continued)

(56) References Cited

U.S. PATENT DOCUMENTS 2,451,678 A * 10/1948 Johnson .............. F16K 11/0743
137/625.29
2,529,544 A * 11/1950 Ebert ...................... F16K 5/162
251/162
(Continued)

FOREIGN PATENT DOCUMENTS

CN 2198478 5/1995
CN 2521454 11/2002
(Continued)

OTHER PUBLICATIONS

Korean Notice of Allowance issued in related Application No. 10-2013-0084547 dated Mar. 23, 2015.
(Continued)

*Primary Examiner* — Eric Keasel
(74) *Attorney, Agent, or Firm* — Ked & Associates, LLP

(57) ABSTRACT

Disclosed is a flow path switching valve. The flow path switching valve includes a housing provided with a plurality of ports in a peripheral direction thereof, the housing having a space in which fluid is received, a valve body including a disc configured to divide the space of the housing into a plurality of flow spaces and to switch a flow direction of fluid via rotation, and a sealing member configured to seal at least one of an upper end and a lower end of the flow spaces, and a pressure plate configured to pressurize the sealing member toward the valve body as the valve body is rotated.

20 Claims, 7 Drawing Sheets

(51) Int. Cl.
*F25B 13/00* (2006.01)
*F25B 41/04* (2006.01)

(52) U.S. Cl.
CPC .. *F25B 41/046* (2013.01); *F25B 2313/02731* (2013.01); *F25B 2313/02741* (2013.01); *F25B 2500/221* (2013.01)

(58) Field of Classification Search
USPC .............................. 137/625.46; 251/158–163
See application file for complete search history.

(56) References Cited

U.S. PATENT DOCUMENTS

| | | | |
|---|---|---|---|
| 3,429,339 A | 2/1969 | Teichmann | |
| 4,418,889 A | 12/1983 | Krause | |
| 4,520,847 A * | 6/1985 | Baron | F16K 11/0833 137/625.22 |
| 4,660,591 A | 4/1987 | Brown et al. | |
| 4,774,977 A | 10/1988 | Cohen | |
| 5,819,798 A * | 10/1998 | Claflin | B41J 2/17 137/625.11 |
| 6,289,931 B1 * | 9/2001 | Sisk | F16K 11/0853 137/625.43 |
| 6,776,189 B1 * | 8/2004 | Wang | F16K 11/074 137/625.46 |
| 8,347,831 B2 * | 1/2013 | Vacca | F16K 11/085 137/625.46 |
| 2011/0073197 A1 | 3/2011 | Hirose | |

FOREIGN PATENT DOCUMENTS

| | | |
|---|---|---|
| CN | 2578630 | 10/2003 |
| CN | 2878831 | 3/2007 |
| JP | H06-030773 | 2/1994 |
| JP | 2000-018405 | 1/2000 |

OTHER PUBLICATIONS

International Search Report issued in Application No. PCT/KR2014/001723 dated Jun. 20, 2014.

* cited by examiner (a)

(b)

FLOW PATH SWITCHING VALVE

CROSS-REFERENCE TO RELATED PATENT APPLICTIONS

This application is a U.S National Stage Application under 35 U.S.C. §371 of PCT Application No. PCT/KR2014/001723, filed Mar. 3, 2014, which claims priority to Korean Patent Application No. 10-2013-0084547, filed Jul. 18, 2013, whose entire disclosures are hereby incorporated by reference.

TECHNICAL FIELD

The present invention relates to a flow path switching valve which may enhance air-tightness and durability.

BACKGROUND ART

FIG. 1 is a view showing a configuration of a general air conditioner 1.

In general, the air conditioner 1 is an apparatus that cools and/or heats an indoor space via sequential implementation of compression, condensation, expansion, and evaporation of refrigerant.

Referring to FIG. 1, the air conditioner 1 includes a cooling/heating cycle comprised of a compressor 2, an outdoor heat exchanger 5, an expansion valve 8, and an indoor heat exchanger 4. In addition, an indoor fan 6 may be provided near the indoor heat exchanger 4, an outdoor fan 7 may be provided near the outdoor heat exchanger 5, and an accumulator 3 may be provided near the compressor 2.

In addition, the air conditioner 1 may include a flow path switching valve 10, for example, a 4-way valve, which selectively supplies refrigerant into a given direction to cool or heat an indoor space. As refrigerant is introduced into one side of the 4-way valve 10, the 4-way valve 10 selectively supplies the refrigerant in an arbitrary direction.

Here, the 4-way valve 10, used to switch a flow direction of refrigerant, may be operated via axial rotation of a valve body that determines a flow path of refrigerant. More specifically, the valve body is rotated by a prescribed angle within a housing, in order to determine a specific discharge flow path.

In addition, the flow path switching valve must have air-tightness to prevent leakage of refrigerant by hermetically sealing a gap between the valve body and the housing.

Typically, a refrigerant flow space may be hermetically sealed via contact friction between the valve body and the housing. However, the valve body coming into contact with the housing may be worn due to rotation of the valve body, and such wear may cause deterioration of air-tightness.

Therefore, there is a demand for a novel valve configuration which may enhance durability and reliability as well as air-tightness.

DISCLOSURE OF INVENTION

Technical Problem

One object of the present invention is to provide a flow path switching valve which may enhance air-tightness.

Another object of the present invention is to provide a flow path switching valve which may maintain air-tightness with respect to omnidirectional surfaces defining a flow space of fluid.

Another object of the present invention is to provide a flow path switching valve which may selectively maintain or release a hermetically sealed state based on rotation of a valve body.

A further object of the present invention is to provide a flow path switching valve which may enhance durability and reliability.

Solution to Problem

In accordance with one aspect of the present invention, there is provided a flow path switching valve including a housing provided with a plurality of ports in a peripheral direction thereof, the housing having a space in which fluid is received, a valve body including a disc configured to divide the space of the housing into a plurality of flow spaces and to switch a flow direction of fluid via rotation, and a sealing module configured to seal at least one of an upper end and a lower end of the flow spaces.

Here, the sealing module may be separated from the valve body when the valve body is rotated, and may come into contact with the valve body when rotation of the valve body stops.

The sealing module may be separated from a peripheral portion of the valve body corresponding to an inner circumferential surface of the housing while the valve body switches a flow path, and may come into contact with the peripheral portion of the valve body when the valve body completes switching of a flow path.

The sealing module may include a sealing member configured to seal at least one of the upper end and the lower end of the flow spaces, and a pressure plate configured to be rotated along with the valve body, the pressure plate selectively pressurizing the sealing member toward the valve body as the valve body is rotated.

The pressure plate may be rotated along with the valve body about a rotation axis of the valve body, and the sealing member may be vertically moved along a rotation axis of the valve body as the valve body is rotated.

The pressure plate may begin to pressurize the sealing member toward the valve body while the valve body switches a flow path, and may cause the sealing member to come into contact with the valve body when the valve body completes switching of a flow path.

Advantageous Effects of Invention

As is apparent from the above description, a flow path switching valve according to one embodiment of the present invention has the following effects.

First, it is possible to maintain air-tightness with respect to omnidirectional surfaces defining a flow space of fluid between a valve body and a housing.

Further, it is possible to selectively maintain or release a hermetically sealed state as the valve body is rotated, which may enhance durability and reliability of constituent elements used to maintain the hermetically sealed state.

Furthermore, the respective constituent elements, used to maintain the hermetically sealed state, are forcibly separated from each other or forcibly come into contact with each other as the valve body is rotated, which may prevent deterioration of air-tightness despite change of external environment.

In addition, as operation for maintenance of the hermetically sealed state depends on rotation of the valve body, the hermetically sealed state may be released while the valve body switches a flow path, and may be realized when the valve body completes switching of a flow path.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
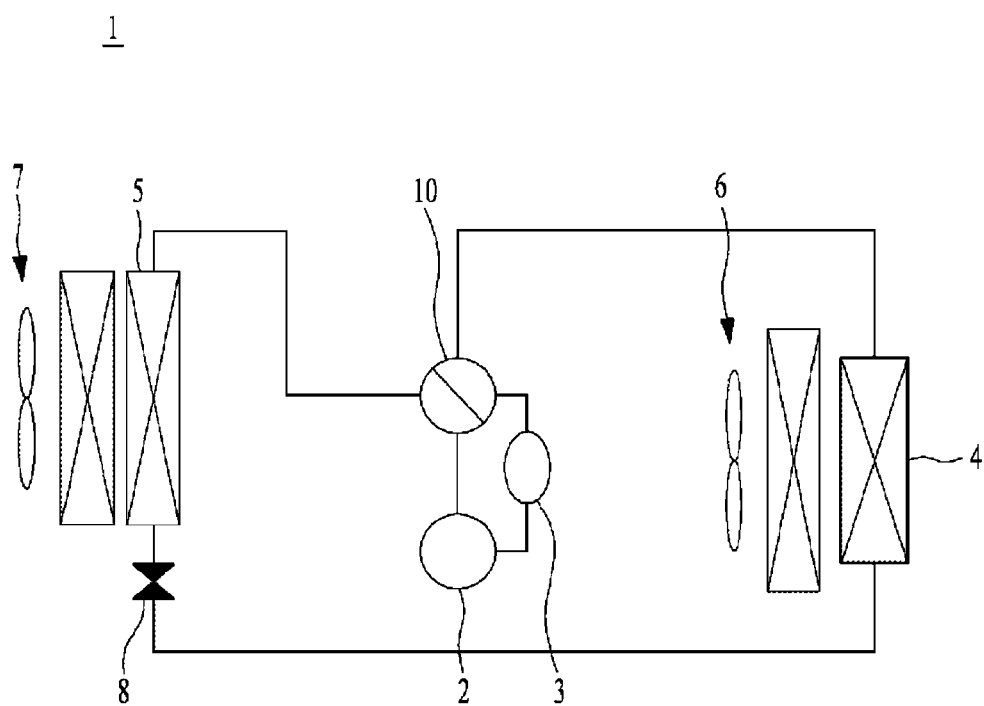
FIG. 1 is a view showing a configuration of a general air conditioner.

Hereinafter, a flow path switching valve according to one exemplarily embodiment of the present invention will be described in detail with reference to the accompanying drawings. The accompanying drawings, which show an exemplarily configuration of the present invention, are provided for detailed explanation of the present invention and are not intended to limit the technical scope of the present invention.

In addition, the same or similar elements are denoted by the same reference numerals even though they are depicted in different drawings, and are not repeatedly described. For convenience of explanation, the size and shape of each constituent element shown in the drawings may be exaggerated or schematically illustrated.

Figure 2:
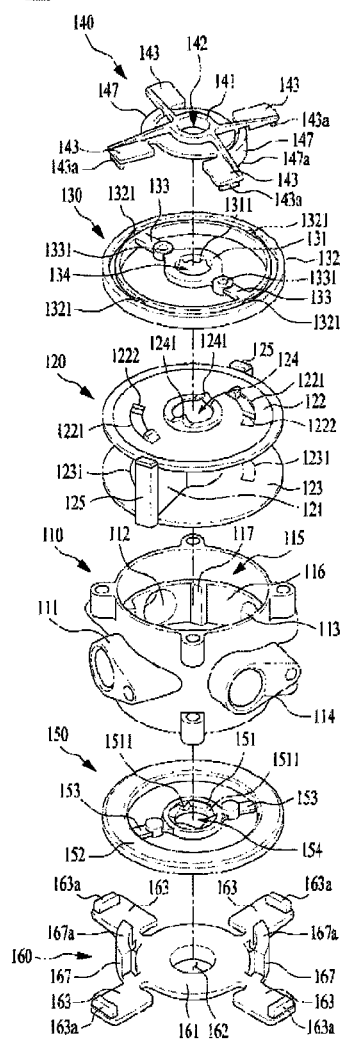
FIG. 2 is an exploded perspective view of a flow path switching valve according to one embodiment of the present invention.
Figure 3:
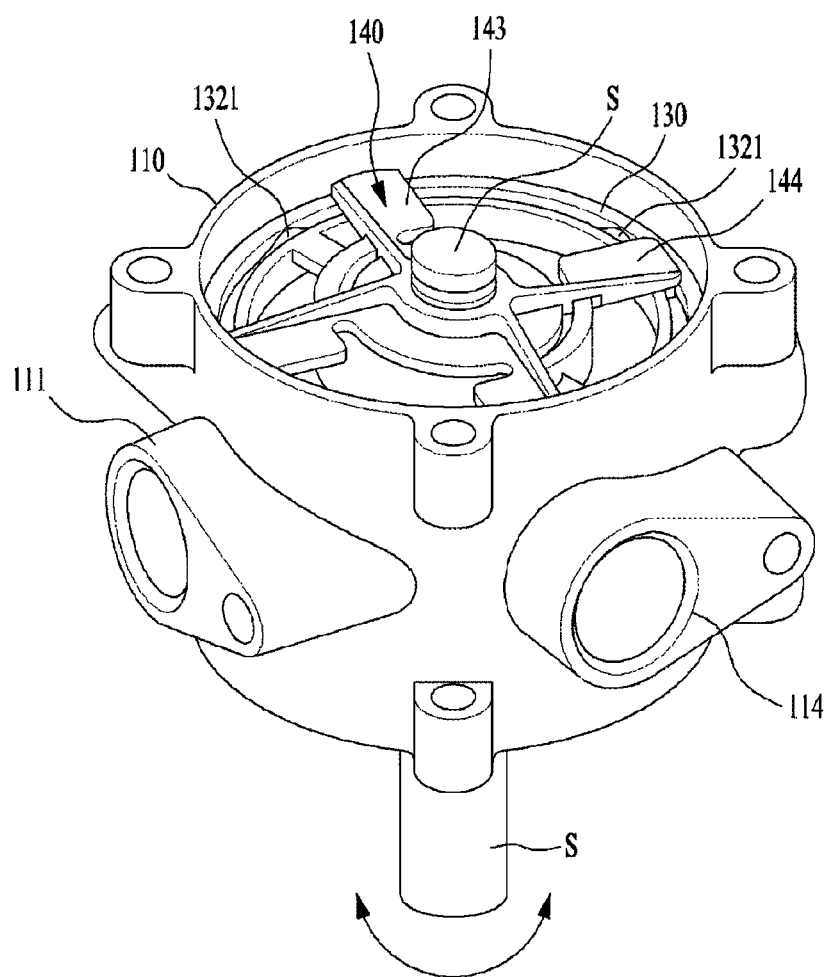
FIG. 3 is a perspective view showing a coupled state of respective constituent elements shown in FIG. 2.
Figure 4:
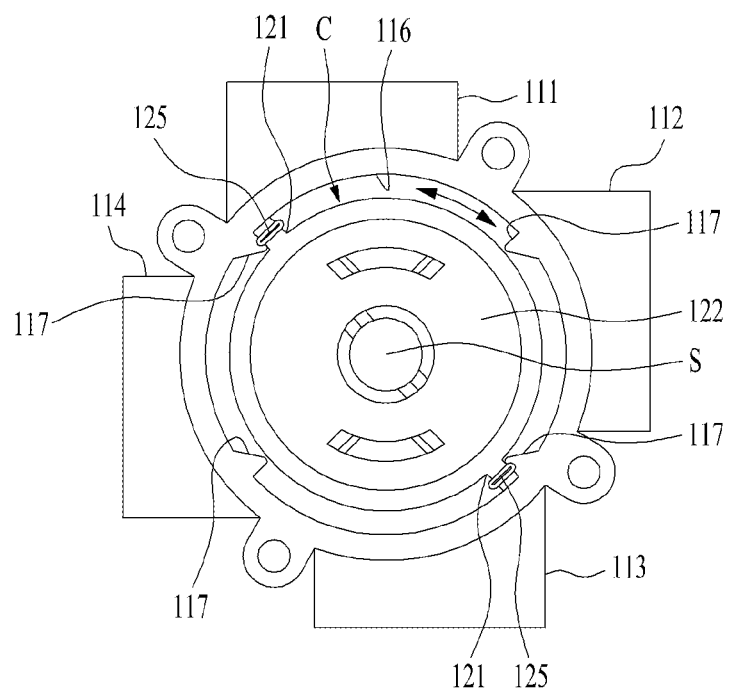
FIG. 4 is a plan view showing a state in which some constituent elements of the flow path switching valve shown in FIG. 3 are removed.

FIG. 2 is an exploded perspective view of a flow path switching valve 100 according to one embodiment of the present invention, FIG. 3 is a perspective view showing a coupled state of respective constituent elements shown in FIG. 2, and FIG. 4 is a plan view showing a state in which some constituent elements of the flow path switching valve 100 shown in FIG. 3 are removed.

The flow path switching valve 100 according to one embodiment of the present invention serves to switch a discharge direction of fluid. More particularly, the flow path switching valve 100 may be a 4-way valve or a 3-way valve that switches a discharge direction of refrigerant based on a cooling mode or a heating mode of an air conditioner. The flow path switching valve 100 in the form of a 4-way valve may be provided with four ports arranged at a prescribed interval, and the flow path switching valve 100 in the form of a 3-way valve may be provided with three ports arranged at a prescribed interval.

The flow path switching valve 100 includes a housing 110, a valve body 120, and sealing modules 130; 140 and 150; 160.

More specifically, the flow path switching valve 100 includes the housing 110 provided in a peripheral direction thereof with a plurality of ports, the housing 110 having a space in which fluid is received, the valve body 120 having a disc 121 configured to divide the space of the housing 110 into a plurality of flow spaces and to switch a flow direction of fluid via rotation, and the sealing modules 130; 140 and 150; 160 configured to seal at least one of an upper end and a lower end of the flow spaces.

Here, the sealing modules 130; 140 and 150; 160 are separated from the valve body 120 during rotation of the valve body 120, and come into contact with the valve body 120 when rotation of the valve body 120 stops.

More specifically, during rotation of the valve body 120 (during switching of a flow path), the sealing modules 130; 140 and 150; 160 are separated from the valve body 120, in order to avoid interference due to rotation friction with the valve body 120. On the other hand, the sealing modules 130; 140 and 150; 160 come into close contact with the valve body 120 to seal an upper end and/or a lower end of the valve body 120 when the valve body 120 completes rotation thereof (i.e. when the valve body 120 completes switching of a flow path).

In particular, the sealing modules 130; 140 and 150; 160 may be separated from a peripheral portion of the valve body 120 corresponding to an inner circumferential surface 116 of the housing 110 while the valve body 120 switches a flow path, and may come into contact with the peripheral portion of the valve body 120 when the valve body 120 completes switching of a flow path.

The sealing modules 130; 140 and 150; 160 may include sealing members 130 and 150 and pressure plates 140 and 160.

Here, the pressure plates 140 and 160 may be rotated along with the valve body 120 about a rotation axis of the valve body 120, and the sealing members 130 and 150 may be vertically moved along a rotation axis of the valve body 120 as the valve body 120 is rotated.

That is, the pressure plates 140 and 160 may be restrained by the valve body 120 so as to be rotated along with the valve body 120, whereas the sealing members 130 and 150 may be vertically moved along a rotation axis of the valve body 120, rather than being rotated via rotation of the valve body 120.

Hereinafter, the respective constituent elements of the flow path switching valve 100 will be described in detail with reference to the accompanying drawings.

The housing 110 defines an external appearance of the flow path switching valve 100, and has an inner space 115 in which fluid is received. The housing 110 may take the form of a cylinder having open upper and lower ends on the basis of the y-axis of FIG. 2.

In addition, the housing 110 is provided in a peripheral direction thereof with a plurality of ports 111 to 114, each of which communicates with the space 115. For convenience of explanation, the plurality of ports 111 to 114 are referred to as a first port 111 to a fourth port 114 in order on the basis of a clockwise rotating direction of a rotation shaft S. As described above, the flow path switching valve 100 having four ports may be a 4-way valve.

In this case, the plurality of ports 111 to 114 may be arranged at an interval of 90 degrees on the basis of the rotation shaft S. This serves to set a flow switching direction of fluid to about 90 degrees, in order to reduce pressure loss. Differently, if the flow path switching valve 100 is a 3-way valve having three ports, the respective ports may be arranged at an interval greater than 90 degrees.

In addition, the housing 110 has an inner circumferential surface 116 defining a flow space C of fluid (refrigerant).

In this case, the inner circumferential surface 116 defining the flow space C may more protrude toward the valve body 120 than the remaining inner circumferential surface of the housing 110. Accordingly, a stepped portion may be formed at a boundary between the inner circumferential surface 116 defining the flow space C and the remaining inner circumferential surface.

In addition, a plurality of sealing protrusions 117 may be formed at the inner circumferential surface 116 of the housing 110. The sealing protrusions 117 may selectively come into contact with the disc 121 of the valve body 120 that will be described hereinafter as the valve body 120 is rotated.

More specifically, the sealing protrusion 117 may come into contact with an elastic member 125 provided at a free end of the disc 121. When the elastic member 125 comes into contact with the sealing protrusion 117 as the valve body 120 is rotated, rotation of the valve body 120 in a first direction is completed.

In addition, the flow space C may be circumferentially sealed as the elastic member 125 and the sealing protrusion 117 come into contact with each other.

That is, as the elastic member 125 and the sealing protrusion 117 come into close contact with each other, it is possible to prevent leakage of fluid (refrigerant) from a gap between the elastic member 125 and the sealing protrusion 117.

The valve body 120 may be rotated in a clockwise or counterclockwise direction while the valve body 120 switches a flow path. The elastic member 125 functions to prevent wear of the disc 121 and the sealing protrusion 117.

In addition, the sealing protrusion 117 may have an inclined or curved surface in order to alleviate shock caused when the sealing protrusion 117 and the elastic member 125 come into contact with each other. That is, the sealing protrusion 117 may have a prescribed inclined or curved portion.

The sealing protrusion 117 may have a symmetrical shape on the basis of a center axis thereof, or may have an eccentric shape.

Assuming that the flow path switching valve 100 is a 4-way valve, the plurality of sealing protrusions 117 may be formed at the inner circumferential surface 116 of the housing 110 at an interval of 90 degrees on the basis of the rotation shaft S. In one embodiment, four sealing protrusions 117 may be formed at the inner circumferential surface 116 of the housing 110.

Differently, assuming that the flow path switching valve 100 is a 3-way valve, the plurality of sealing protrusions 117 may be formed at the inner circumferential surface 116 of the housing 110 at an interval greater than 90 degrees on the basis of the rotation shaft S.

Meanwhile, the valve body 120 may have the disc 121 configured to divide the space 115 into a plurality of flow spaces and to switch a flow direction of fluid via rotation.

In addition, the valve body 120 may be rotatably installed in the space 115 of the housing 110 via the rotation shaft S.

To this end, the valve body 120 has a through-hole 124 into which the rotation shaft S is inserted.

The valve body 120 is rotatable in a counterclockwise direction (also referred to as a first direction) or in a clockwise direction (also referred to as a second direction). When the valve body 120 is rotated in the first or second direction, the valve body 120 may be rotated by an angle of 90 degrees at a time.

That is, a discharge flow direction of fluid may be switched based on rotation of the valve body 120. As the valve body 120 is rotated by an angle of 90 degrees to switch a flow path of refrigerant, a flow switching direction of the refrigerant may be set to about 90 degrees.

Accordingly, it is possible to minimize pressure drop caused while refrigerant passes through the flow path switching valve 100.

The rotation shaft S may be rotated by an electrically driven actuator (not shown). That is, the rotation shaft S may be a subordinate component of the electric actuator and be rotated in a clockwise or counterclockwise direction.

The valve body 120 may include a first plate 122 and a second plate 123 arranged respectively at an upper end and a lower end of the disc 121 on the basis of the y-axis of FIG. 2.

The disk 121 may be a vertical wall to connect the first plate 122 and the second plate 123.

The space 115 of the housing 110 may be divided into a plurality of flow spaces C by the first plate 122, the disc 121, and the second plate 123. In one embodiment, the space 115 may be divided into two flow spaces by the first plate 122, the disc 121, and the second plate 123.

The first plate 122 and the second plate 123 may have the same configuration. In one embodiment, the first plate 122 and the second plate 123 may be circular plates.

Note that the first plate 122 and the second plate 123 face in opposite directions on the basis of the disc 121. For example, referring to FIG. 2, stoppers 1222 of the first plate 122 are oriented upward to face the first sealing member 130, whereas stoppers (not shown) of the second plate 123 are oriented downward to face the second sealing member 150.

The first plate 122 and the second plate 123 may respectively include insertion slots 1221 and 1231, and the stoppers 1222 provided at both longitudinal ends of the insertion slots 1221 and 1231.

Meanwhile, the sealing members 130 and 150 are vertically moved toward the valve body 120 by the pressure plates 140 and 160. In this case, when the sealing members 130 and 150 are pressurized toward the valve body 120, connection rods 133 and 153 of the sealing members 130 and 150 that will be described hereinafter may be supported by the stoppers 1222.

In addition, the first plate 122 and the second plate 123 may have a stepped structure at a longitudinal end portion thereof facing the inner circumferential surface 116 of the housing 110.

For example, the longitudinal end portion of each of the first plate 122 and the second plate 123 may have a thickness less than a thickness of the remaining portion. The sealing member 130 or 150 may be seated on the stepped longitudinal end portion of the first plate 122 or the second plate 123.

A diameter of the first plate 122 and the second plate 123 may be less than a diameter of the disc 121. This may prevent the first plate 122 and the second plate 123 from being worn by coming into contact with the inner circumferential surface 116 of the housing 110 while the valve body 120 is rotated to switch a flow path.

That is, a portion of the disc 121 and/or the elastic member 125 may be located at the outside of the first plate 122 and the second plate 123.

The sealing members 130 and 150 are disposed on at least one place above and below the valve body 120. The sealing members 130 and 150 function to seal at least one of the upper end and the lower end of the flow spaces C.

For convenience of explanation, on the basis of FIG. 2, the sealing members 130 and 150 may include a first sealing member 130 disposed above the valve body 120 and a second sealing member 150 disposed below the valve body 120.

That is, the first sealing member 130 functions to selectively seal the upper end of the flow spaces C, and the second sealing member 150 functions to selectively seal the lower end of the flow spaces C.

More specifically, the sealing members 130 and 150 may be separated from the peripheral portion of the valve body 120 corresponding to the inner circumferential surface 116 of the housing 110 while the valve body 120 switches a flow path, and may come into contact with the peripheral portion of the valve body 120 when the valve body 120 completes switching of a flow path.

Meanwhile, as described above, the peripheral portion of the valve body 120 may include the longitudinal end portion of the first plate 122 and the longitudinal end portion of the second plate 123, and the first plate 122 and the second plate 123 are spaced apart from the inner circumferential surface 116 of the housing 110 by a prescribed distance.

Accordingly, the first sealing member 130 may seal a gap between the first plate 122 and the inner circumferential surface 116 of the housing 110 (i.e. the upper end of the flow spaces C), and the second sealing member 150 may seal a gap between the second plate 123 and the inner circumferential surface 116 of the housing 110 (i.e. the lower end of the flow spaces C).

More specifically, the sealing members 130 and 150, more particularly, the first sealing member 130 and the second sealing member 150 may respectively include an inner rim portion 131 or 151 having a through-hole 134 or 154 for passage of the rotation shaft S and a plurality of indentations 1311 and 1511, an outer rim portion 132 or 152 having a plurality of first ridges 1321 (also referred to as first cam portions), and a plurality of connection rods 133 or 153 connecting the inner rib portion 131 or 151 and the outer rim portion 132 or 152 to each other.

Alternatively, the inner rim portion 131 or 151 may have the plurality of first ridges 1321, and the outer rim portion 132 or 152 may have the plurality of indentations 1311 or 1511.

Here, assuming that the first sealing member 130 and the second sealing member 150 have the same configuration, the first sealing member 130 and the second sealing member 150 face in opposite directions on the basis of the valve body 120.

Both the inner rim portion 131 and the outer rim portion 132 may have a ring shape.

If the flow path switching valve 100 is a 4-way valve, the plurality of indentations 1311 may be arranged at an interval of 90 degrees on the basis of the rotation shaft S, and the plurality of first ridges 1321 may be arranged at an interval of 90 degrees on the basis of the rotation shaft S. This serves to set a flow switching direction of fluid to about 90 degrees as described above.

Differently, if the flow path switching valve 100 is a 3-way valve, the plurality of indentations 1311 may be arranged at an interval greater than 90 degrees on the basis of the rotation shaft S, and the plurality of first ridges 1321 may be arranged at an interval greater than 90 degrees on the basis of the rotation shaft S.

Meanwhile, the pressure plates 140 and 160 are rotated along with the valve body 120, and pressurize the sealing members 130 and 150 toward the valve body 120 as the valve body 120 is rotated.

For convenience of description, on the basis of FIG. 2, the pressure plates 140 and 160 may include a first pressure plate 140 disposed above the first sealing member 130 and a second pressure plate 160 disposed below the second sealing member 150.

More specifically, the first pressure plate 140 pressurizes the first sealing member 130 toward the valve body 120 as the valve body 120 is rotated.

More specifically, the first pressure plate 140 pressurizes the outer rim portion 132 of the first sealing member 130 toward a peripheral portion of the first plate 121, thereby allowing the first sealing member 130 to seal the gap between the first plate 122 and the inner circumferential surface 116 of the housing 110 (i.e. the upper end of the flow spaces C).

Likewise, the second pressure plate 160 pressurizes the outer rim portion 152 of the second sealing member 150 toward a peripheral portion of the second plate 123, thereby allowing the second sealing member 150 to seal the gap between the second plate 123 and the inner circumferential surface 116 of the housing 110 (i.e. the lower end of the flow spaces C).

The pressure plates 140 and 160, more particularly, the first pressure plate 140 and the second pressure plate 160 may respectively include a base portion 141 or 161 having a through-hole 142 or 162 for insertion of the rotation shaft S, a plurality of pressure portions 143 or 163 radially extending from the base portion 141 or 161, and reinforcement ribs 147 or 167 formed between two neighboring pressure portions 143 or 163.

Each of the pressure portions 143 or 163 is provided with a pressure boss 143a or 163a protruding toward the sealing member 130 or 150.

Here, if the flow path switching valve 100 is a 4-way valve, the plurality of pressure portions 143 or 163 may be arranged at an interval of 90 degrees on the basis of the rotation shaft S, and thus the respective pressure bosses 143a or 163a may be arranged at an interval of 90 degrees on the basis of the rotation shaft S.

Differently, if the flow path switching valve 100 is a 3-way valve, the plurality of pressure portions 143 or 163 may be arranged at an interval greater than 90 degrees on the basis of the rotation shaft S, and thus the respective pressure bosses 143a or 163a may be arranged at an interval greater than 90 degrees on the basis of the rotation shaft S.

The pressure bosses 143a and 163a of the pressure portions 143 and 163 may be located to correspond to the first ridges 1321 of the sealing members 130 and 150.

That is, as the pressure plates 140 and 160 are rotated, the pressure bosses 143a and 163a may selectively come into contact with or be separated from the first ridges 1321 of the sealing members 130 and 150.

When the pressure bosses 143*a* and 163*a* come into contact with the first ridges 1321, the pressure portions 143 and 163 may pressurize the respective sealing members 130 and 160 toward the valve body 120.

The first pressure plate 140 and the second pressure plate 160 may have the same configuration and shape, upon assembly, the first pressure plate 140 and the second pressure plate 160 may be oriented to face in opposite directions. That is, referring to FIG. 2, the first and second pressure plates 140 and 160 may face in opposite directions on the basis of the valve body 120.

As described above, the valve body 120 has the insertion slots 1221 and 1231.

Here, the reinforcement ribs 147 and 167 may be respectively provided with inserts 147*a* and 167*a*, which protrude toward the valve body 120 and are inserted into the insertion slots 1221 and 1231.

With this configuration, during rotation of the rotation shaft S, the pressure plates 140 and 160 and the valve body 120 may restrain rotation of one another via engagement of the insertion slots 1221 and 1231 and the inserts 147*a* and 167*a*.

That is, torque of the rotation shaft S may be transmitted to the pressure plates 140 and 160 through the valve body 120, and may be transmitted to the valve body 120 through the pressure plates 140 and 160.

In one embodiment, if the pressure plates 140 and 160 are rotated via rotation of the rotation shaft S, torque of the pressure plates 140 and 160 may be transmitted to the valve body 120 by the inserts 147*a* and 167*a* inserted into the insertion slots 1221 and 1231.

When the rotation shaft S having a relatively long length directly rotates the valve body 120, a rotation axis of the rotation shaft S may be distorted due to processing error or assembly tolerance. Therefore, the rotation shaft S may be configured to directly rotate the pressure plates 140 and 160, rather than directly rotating the valve body 120.

The embodiment in which the pressure plates 140 and 160 pressurize the sealing members 130 and 150 to seal the upper end and the lower end of the flow spaces C defined between the housing 110 and the valve body 120 has been described above.

However, sealing of the upper end and the lower end of the flow spaces C as described above may be accomplished only when rotation of the valve body 120 is completed, i.e. when switching of a flow path is completed.

More specifically, the pressure plates 140 and 160 may begin to pressurize the sealing members 130 and 150 toward the valve body 120 while the valve body 120 switches a flow path. Then, when the valve body 120 completes switching of a flow path, simultaneously, the pressure plates 140 and 160 may cause the sealing members 130 and 150 to come into contact with the valve body 120.

In addition, if the sealing members 130 and 150 seal the upper end and the lower end of the flow spaces C while the valve body 120 is rotated, i.e. while the valve body 120 switches a flow path, friction between the sealing members 130 and 150 and the peripheral portion of the valve body 120 may occur, which causes damage to the sealing members 130 and 150.

Accordingly, the sealing members 130 and 150 may be separated from the peripheral portion of the valve body 120 corresponding to the inner circumferential surface 116 of the housing 110 while the valve body 120 switches a flow path.

To this end, the valve body 120 may have a plurality of second ridges 1241 (also referred to as second cam portions) to pressurize the sealing members 130 and 150 toward the pressure plates 140 and 160, and the sealing members 130 and 150 may have the plurality of indentations 1311 or 1511 for insertion of the second ridges 1241.

More specifically, the second ridges 1241 may separate the sealing members 130 and 150 from the peripheral portion of the valve body 120 corresponding to the inner circumferential surface 116 of the housing 110 while the valve body 120 switches a flow path, and may be inserted into the indentations 1311 and 1511 when the valve body 120 completes switching of a flow path.

That is, the sealing members 130 and 150 are spaced apart from the peripheral portion of the valve body 120 by a height of the second ridges 1241 during switching of a flow path.

Meanwhile, when the pressure portions 143 and 163 of the pressure plates 140 and 160 pressurize the first ridges 1321 of the sealing members 130 and 150, the second ridges 1241 of the valve body 120 may be inserted into the indentations 1311.

In summary, the sealing members 130 and 150 are repeatedly vertically moved as the valve body 120 is rotated, thereby sealing the peripheral portion of the valve body 120 or being separated from the peripheral portion of the valve body 120.

That is, as upward movement and downward movement of the sealing members 130 and 150 are realized by a mechanical cam structure (including the first cam portions and the second cam portions), sealing efficacy does not vary according to external environment.

Meanwhile, to ensure uniform distribution of pressure and to prevent damage due to friction, the first ridges 1321, the second ridges 1241, and the indentations 1311 may respectively have a plurality of inclined portions and/or curved portions.

Figure 5:
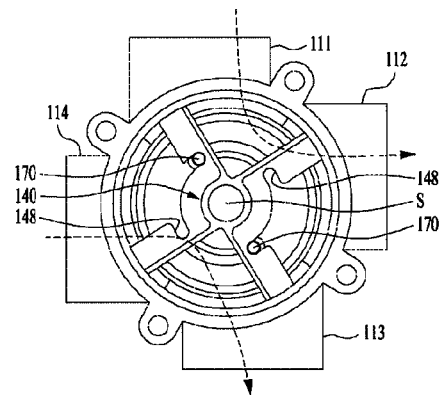
FIG. 5 is a plan view explaining an operating state of the flow path switching valve according to one embodiment of the present invention.
Figure 5:
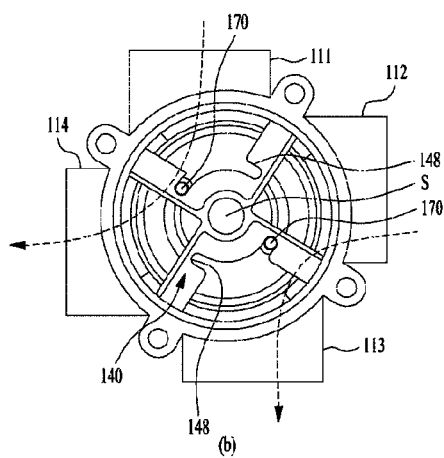

FIG. 5 is a plan view explaining an operating state of the flow path switching valve 100 according to one embodiment of the present invention.

The sealing members 130 and 150, more particularly, the first sealing member 130 and the second sealing member 150 are not rotated by the rotation shaft S.

This is because, if the first sealing member 130 and the second sealing member 150 are rotated along with the valve body 120, the first sealing member 130 and the second sealing member 150 may have a high likelihood of damage due to friction, and wear of the first sealing member 130 and the second sealing member 150 may cause leakage of refrigerant.

For this reason, to prevent rotation of the sealing members 130 and 150 when the valve body 120 is rotated, the flow path switching valve 100 may further include guide pins 170 mounted to the sealing members 130 and 150.

The guide pins 170 may be fixed to connection holes 1331 formed in the connection rods 133 and 153 of the sealing members 130 and 150. In addition, the flow path switching valve 100 may include cover members (not shown) coupled to the housing 110 to enclose the pressure plates 140 and 160, and the guide pins 170 may be fixed to the cover members.

In one embodiment, both longitudinal ends of each guide pin 170 may be fixed respectively to the cover member and the connection hole 1331.

Referring to FIG. 5(*a*), when the rotation shaft S is rotated in a counterclockwise direction by an angle of about 90 degrees, refrigerant introduced into the first port 111 may be discharged from the second port 112, and refrigerant introduced into the fourth port 114 may be discharged from the third port 113.

Referring to FIG. 5(*b*), when the rotation shaft S is rotated in a clockwise direction by an angle of about 90 degrees, refrigerant introduced into the first port 111 may be discharged from the fourth port 114, and refrigerant introduced into the second port 112 may be discharged from the third port 113.

The pressure plate 140 may be separated from the guide pins 170 while the valve body 120 switches a flow path, and may come into contact with the guide pins 170 when the valve body 120 completes switching of a flow path. To this end, each of the pressure portions 143 of the pressure plate 140 may have a receiving recess 148 for insertion of the guide pin 170.

That is, the guide pins 170 may function to prevent rotation of the sealing members 130 and 150, and may also function as stoppers to restrain (limit) a radius of rotation of the pressure plate 140.

Figure 6:
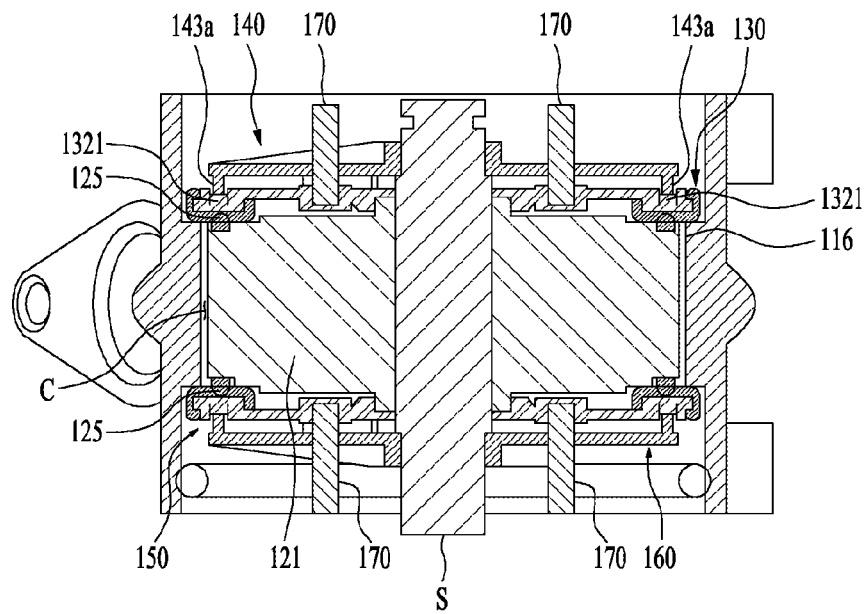
FIG. 6 is a sectional view explaining a first operating state of the flow path switching valve according to one embodiment of the present invention.
Figure 7:
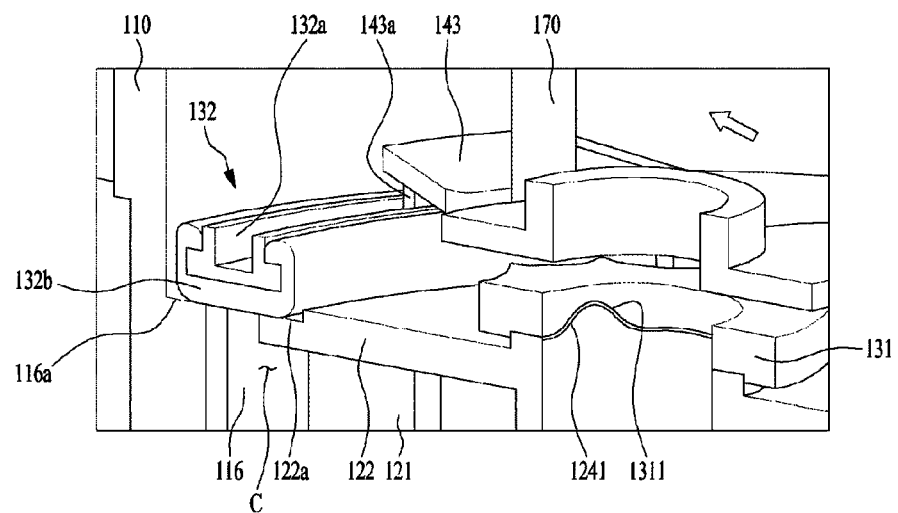
FIG. 7 is a perspective view of some important constituent elements for explanation of the first operating state of the flow path switching valve according to one embodiment of the present invention.
Figure 8:
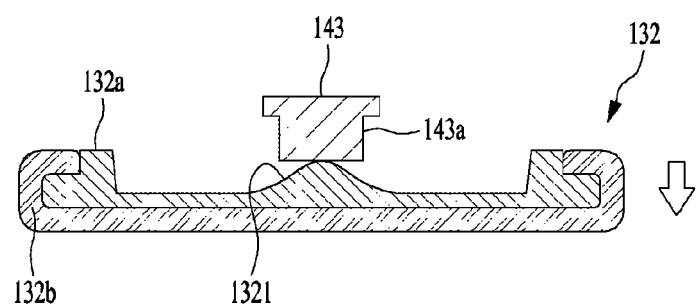
FIG. 8 is a sectional view of some important constituent elements for explanation of the first operating state of the flow path switching valve according to one embodiment of the present invention.

FIG. 6 is a sectional view explaining a first operating state of the flow path switching valve 100 according to one embodiment of the present invention, FIG. 7 is a perspective view of some important constituent elements for explanation of the first operating state of the flow path switching valve 100 according to one embodiment of the present invention, and FIG. 8 is a sectional view of some important constituent elements for explanation of the first operating state of the flow path switching valve 100 according to one embodiment of the present invention.

FIGS. 6 to 8 are views explaining the connection relationship between the respective constituent elements after rotation of the valve body 120 is completed, i.e. after switching of a flow path is completed. For convenience of explanation, only a configuration of sealing the upper end of the flow spaces C via the first sealing member 130 and the first pressure plate 140 will be described hereinafter by way of example.

When the valve body 120 completes switching of a flow path, the pressure bosses 143*a* come into contact with the first ridges 1321 of the first sealing member 130 as the first pressure plate 140 is rotated, thereby pressurizing the first ridges 1321 toward the first plate 122.

Thereby, the first sealing member 130 may come into close contact with the peripheral portion of the valve body 120. That is, the first sealing member 130 seals the gap between the first plate 122 and the inner circumferential surface 116 of the housing 110 (i.e. the upper end of the flow space C).

Meanwhile, a thickness of the longitudinal end portion (the peripheral portion) of the first plate 122 may be less than a thickness of the remaining portion. More specifically, the peripheral portion of the first plate 122 may be provided with a stepped surface 122*a*.

In addition, a stepped surface 116*a* may be formed at a boundary between the inner circumferential surface 116 of the housing 110 defining the flow space C and the remaining inner circumferential surface. The first sealing member 130 may be seated on and come into close contact with the stepped surface 116*a* of the housing 110 and the stepped surface 122*a* of the first plate 122.

When the pressure portions 143 of the first pressure plate 140 pressurize the first ridges 1321 of the first sealing member 130, the second ridges 1241 of the valve body 120 are inserted into the indentations 1311.

In addition, the stoppers 1222 of the first plate 122 may come into contact with the connection rods 133 of the first sealing member 130.

Meanwhile, the outer rim portion 132 of the first sealing member 130 may include a frame 132*a* and a rubber film 132*b* surrounding the frame 132*a*. The rubber film 132*b* may be seated on and come into close contact with the stepped surface 116*a* of the housing 110 and the stepped surface 122*a* of the first plate 122.

In addition, when the second sealing member 150 seals the lower end of the flow space C, the relationship between the second plate 123 and the second sealing member 150 and the relationship between the second sealing member 150 and the second pressure plate 160 are equal to the relationship between the first plate 122 and the first sealing member 130 and the relationship between the first sealing member 130 and the first pressure plate 140.

Figure 9:
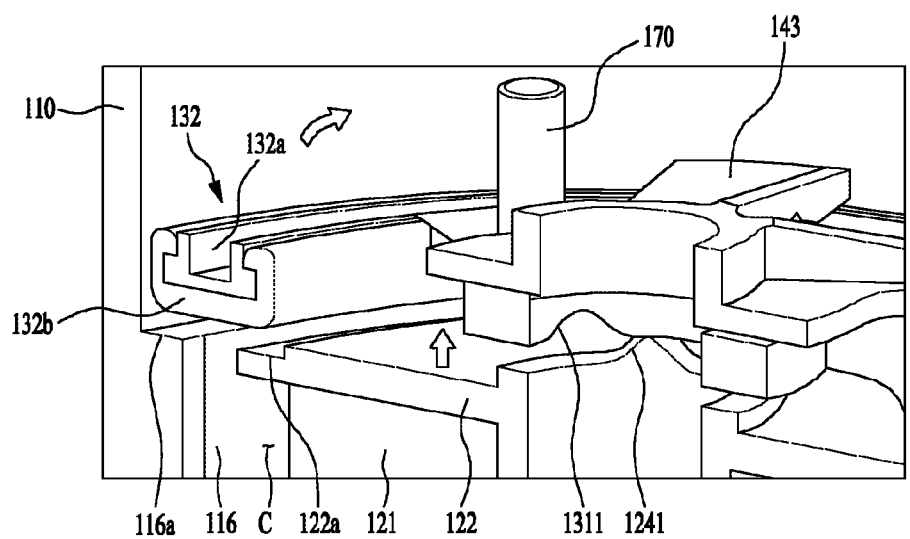
FIG. 9 is a perspective view of some important constituent elements for explanation of a second operating state of the flow path switching valve according to one embodiment of the present invention.
Figure 10:
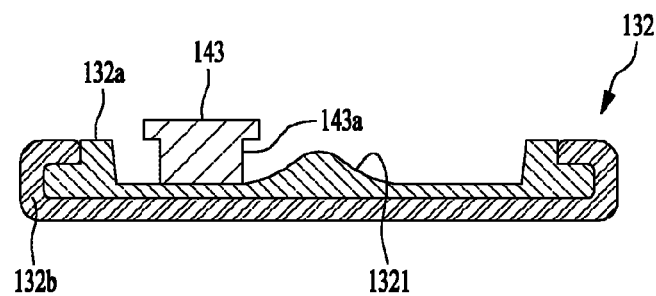
FIG. 10 is a sectional view of some important constituent elements for explanation of the second operating state of the flow path switching valve according to one embodiment of the present invention.

FIG. 9 is a perspective view of some important constituent elements for explanation of a second operating state of the flow path switching valve 100 according to one embodiment of the present invention, and FIG. 10 is a sectional view of some important constituent elements for explanation of the second operating state of the flow path switching valve 100 according to one embodiment of the present invention.

FIGS. 9 and 10 are views explaining the connection relationship between the respective constituent elements while the valve body 120 is rotated, i.e. while the valve body 120 switches a flow path.

The pressure bosses 143*a* are separated from the first ridges 1321 of the first sealing member 130 as the first pressure plate 140 is rotated while the valve body 120 switches a flow path.

In addition, the second ridges 1241 of the valve body 120 are separated from the indentations 1311 of the valve body 120.

Accordingly, the peripheral portion (the outer rim portion) of the first sealing member 130 is spaced apart from the peripheral portion of the valve body 120 by a height of the second ridges 1241.

Mode for the Invention

As described above, a related description has sufficiently been discussed in the above "Best Mode" for implementation of the present invention.

INDUSTRIAL APPLICABILITY

As described above, the present invention may be wholly or partially applied to a flow path switching valve.

The invention claimed is:

1. A flow path switching valve comprising:
   a housing having a cavity in which fluid is received, the housing having an opening on at least one of an upper end or a lower end and a plurality of ports on a lateral side;
   a valve body rotatably provided in the cavity, the valve body including a divider that divides the cavity into a plurality of flow spaces and configured to switch a flow path through prescribed ones of the plurality of ports based on rotation of the divider; and
   a sealing module provided over the opening to seal the opening of the housing,
   wherein the sealing module is configured to move relative to the opening based on the rotation of the valve body such that the sealing module is separated from the valve body when the valve body is rotated and comes into contact with the valve body when rotation of the valve body stops.

2. The flow path switching valve according to claim 1, wherein the sealing module seals a gap between a peripheral portion of the valve body that corresponds to an inner circumferential surface of the cavity and the inner circumferential surface of the cavity.

3. The flow path switching valve according to claim 1, wherein the sealing module includes
a sealing member configured to seal the opening, and
a pressure plate provided over the sealing member,
wherein the pressure plate is configured to rotate with the valve body and to push the sealing member toward the valve body based on the rotation.

4. The flow path switching valve according to claim 3, wherein the pressure plate and the valve body are configured to rotate about a rotational axis of the valve body, and
wherein the sealing member is configured to move vertically along the rotational axis of the valve body as the valve body rotates.

5. The flow path switching valve according to claim 3, wherein the pressure plate pushes the sealing member toward the valve body as the valve body rotates to switch the flow path such that the sealing member is in contact with the valve body when the valve body completes the rotation to switch the flow path.

6. The flow path switching valve according to claim 3, wherein the sealing member has a plurality of first ridges that protrude toward the pressure plate and the pressure plate has a plurality of pressure portions in a mechanical linkage with the plurality of first ridges, the plurality of pressure portions configured to press against the first ridges during rotation of the pressure plate to push the sealing member against the valve body.

7. The flow path switching valve according to claim 6, wherein the valve body has a plurality of second ridges and the sealing member has a plurality of indentations in a mechanical linkage with the plurality of second ridges, wherein the plurality of second ridges and the plurality of indentations are configured to separate the sealing member from the valve body during rotation of the valve body and the second ridges are positioned in the plurality of indentations when the sealing member is in contact with the valve body.

8. The flow path switching valve according to claim 7, wherein the sealing member includes
an inner rim portion through which a rotation shaft passes, the inner rim portion having the plurality of indentations,
an outer rim portion having the plurality of first ridges, and
a plurality of connection rods that connect the inner rim portion and the outer rim portion to each other.

9. The flow path switching valve according to claim 8, wherein the housing is provided with four or three ports arranged at a prescribed interval,
wherein the plurality of indentations are arranged at an interval of 90 degrees or more about the rotation shaft,
wherein the plurality of first ridges are arranged at an interval of 90 degrees or more about the rotation shaft, and
wherein the plurality of ports are arranged at an interval of 90 degrees or more about the rotation shaft.

10. The flow path switching valve according to claim 7, wherein the sealing member includes
an inner rim portion through which a rotation shaft passes, the inner rim portion having the plurality of first ridges,
an outer rim portion having the plurality of indentations, and
a plurality of connection rods that connect the inner rim portion and the outer rim portion to each other.

11. The flow path switching valve according to claim 10, wherein the housing is provided with four or three ports arranged at a prescribed interval,
wherein the plurality of indentations are arranged at an interval of 90 degrees or more about the rotation shaft,
wherein the plurality of first ridges are arranged at an interval of 90 degrees or more about the rotation shaft, and
wherein the plurality of ports are arranged at an interval of 90 degrees or more about the rotation shaft.

12. The flow path switching valve according to claim 7, wherein the second ridges cause the sealing member to be separated from the peripheral portion of the valve body corresponding to the inner circumferential surface of the housing during rotation of the valve body to switch the flow path, and
wherein the second ridges are positioned in the indentations such that the sealing member comes into contact with the peripheral portion of the valve body corresponding to the inner circumferential surface of the housing when the valve body completes the rotation to switch the flow path.

13. The flow path switching valve according to claim 7, wherein the second ridges of the valve body are positioned in the indentations when the pressure portions of the pressure plate presses against the first ridges of the sealing member.

14. The flow path switching valve according to claim 13, wherein the first ridges, the second ridges, and the indentations respectively have a prescribed inclination or curvature.

15. The flow path switching valve according to claim 6, wherein the pressure plate includes
a base portion having a through-hole for insertion of a rotation shaft, the plurality of pressure portions radially extending from the base portion, and
a reinforcement rib provided between two neighboring pressure portions.

16. The flow path switching valve according to claim 15, wherein the reinforcement rib has a protrusion that protrudes toward the valve body,
wherein the valve body has an insertion slot to accommodate the protrusion, and
wherein a torque of the pressure plate is transmitted to the valve body by the protrusion inserted into the insertion slot when the pressure plate is rotated via rotation of the rotation shaft.

17. The flow path switching valve according to claim 3, further including a guide pin mounted to the sealing member to prevent the sealing member from being rotated with the valve body when the valve body is rotated.

18. The flow path switching valve according to claim 17, wherein the pressure plate contacts the guide pin to limit rotation of the pressure plate corresponding to a prescribed position of the valve body for a prescribed flow path.

19. The flow path switching valve according to claim 1, wherein an elastic member is provided at a distal end of the divider and a sealing protrusion is provided on the inner circumferential surface of the housing to correspond to the elastic member, wherein the sealing protrusion is configured to contact the elastic member to provide a seal between the valve body and the inner circumferential surface of the housing when the valve body is rotated to a prescribed position.

20. An air conditioner comprising:
a cooling/heating cycle including a compressor, an outdoor heat exchanger, an expansion valve, and an indoor heat exchanger; and
a flow path switching valve coupled to the cooling/heating cycle to change a direction of flow of refrigerant in the cooling/heating cycle,
wherein the flow path switching valve includes
a housing having a cavity in which fluid is received, the housing having an opening on an upper end and a plurality of ports on a lateral side,
a valve body rotatably provided in the cavity and configured to change the direction of flow of the refrigerant through respective ports based on a positon of the valve body, and
a sealing module provided over the opening to be in mechanical linkage with the valve body to seal the opening based on rotation of the valve body, wherein
when the valve body is in a first position, the sealing module is configured to contact the valve body to seal the opening, and
while the valve body is rotated from the first position to a second position, the valve body is configured to raise the sealing module away from the valve body such that the sealing module does not contact the valve body during the rotation.

* * * * *